July 11, 1967  J. M. HASSIG ET AL  3,330,735
LIQUID-MODERATED NUCLEAR REACTOR
Filed Aug. 16, 1965  2 Sheets-Sheet 1

INVENTORS
JEAN MARC HASSIG
ALPHONSE PEUCHMAUR
ROLAND ROCHE
BERNARD THOMAS
BY Bacon & Thomas
ATTORNEYS

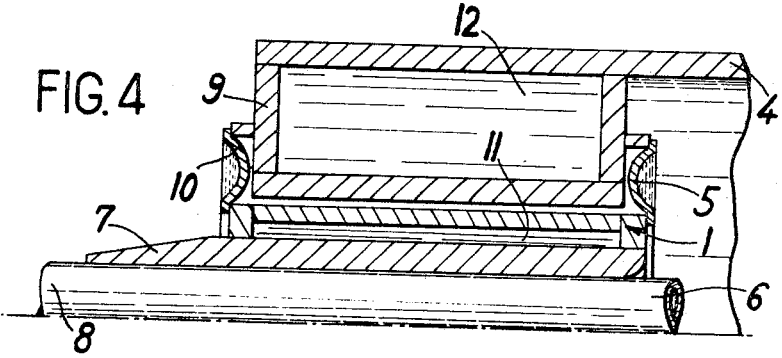
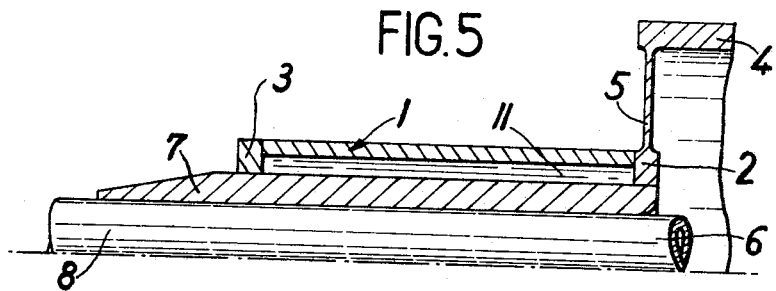
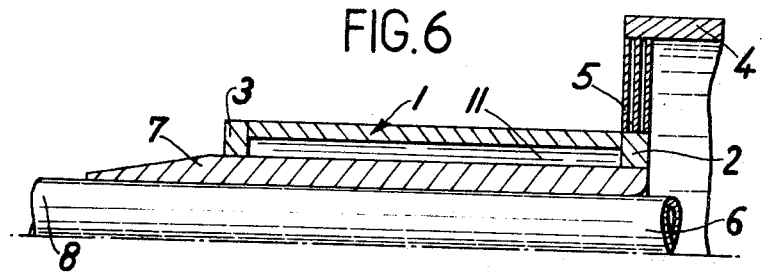
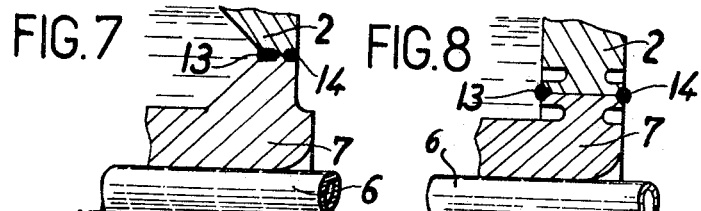
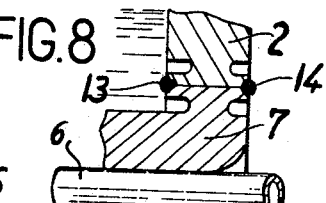

United States Patent Office 3,330,735
Patented July 11, 1967

3,330,735
LIQUID-MODERATED NUCLEAR REACTOR
Jean Marc Hassig, Orsay, Alphonse Peuchmaur, Boulogne,
  Seine, Roland Roche, Clamart, and Bernard Thomas,
  Levallois-Perret, France, assignors to Commissariat a
  l'Energie Atomique, Paris, France, an organization of
  France
Filed Aug. 16, 1965, Ser. No. 534,543
Claims priority, application France, Aug. 14, 1964,
985,307
6 Claims. (Cl. 176—44)

The present invention relates to a nuclear-reactor vessel adapted to contain a liquid moderator (for instance, heavy water $D_2O$) and comprising pressure-tubes which contain the nuclear fuel and through which flows a high-pressure gaseous coolant (e.g., $CO_2$).

More specifically, the present invention is concerned with the tight and, at the same time, flexible connection of the vessel boundary-heads with the vessel outer-cover, on the one hand, and with the fuel pressure-tubes, on the other hand.

The moderator lies outside the pressure-tubes and is not under pressure. On the other hand, the pressure-tubes must be able to withstand the high pressure of the coolant flowing through them; moreover, these tubes must be able to operate in an intense neutron flux and, therefore, aluminium and zirconium are specially advisable metals for their manufacture.

It is known that, in such liquid moderator nuclear-reactors, the vessel containing the liquid moderator, and also the reflector, is a one-piece structure which must be permanently tight and able to withstand corrosion. Reactor-vessels are known in which the two boundary-heads are in the form of water-cooled tanks (or drums) connected by an outer-cover of stainless steel, said heads being also of stainless steel. These two heads are firmly coupled by means of fuel pressure-tubes of zircalloy. The whole vessel is, in general, supported by supporting means located under each of the two heads; one of said heads is made steady by abutments located in the corresponding supporting means, whereas the other head can freely move longitudinally, thus permitting the vessel to expand parallel to its axis. One drawback of such a one-piece structure is to submit the fuel pressure-tubes and the vessel heads to huge stresses due to the fact that the zircalloy of which these tubes are made has a coefficient of expansion substantially lower than that of the stainless steel of which the outer-cover is made.

Since the vessel parts are mounted at a temperature of about 15° C. (60° F.) and the vessel, when in operation, can reach temperatures of 100° C. and above (212° F. and above), a difference between the final length of the outer-cover and that of the fuel pressure-tubes will result, and that difference can be taken up only by the tensile strain of the fuel pressure-tubes, by a compression of the outer-cover and by the warping of the vessel heads. In addition, a longitudinal force due to the pressure of the gas (for instance $CO_2$) contained in the fuel tubes is transmitted to the vessel through the medium of the portions of the fuel tubes outside said vessel; that force tends to increase the length of the fuel tubes and to cause the vessel heads to warp.

In order to overcome the above stresses and an over-pressure inside the vessel should the fuel pressure-tubes happen to be broken, it is necessary to achieve resistant connections between the outer-cover and the vessel heads and also between the fuel-tubes and the vessel heads; such resistant connections require deep welds difficult to obtain and which take much time.

The present invention is free of the above mentioned drawbacks.

Its main object is to provide a nuclear-reactor vessel containing a liquid moderator (for instance, heavy water $D_2O$) and provided with fuel pressure-tubes, said vessel being characterized in that it comprises, on the one hand, between its outer-cover and each of its two boundary-heads, a tight and flexible connecting element fixed to said outer-cover and head by thin welds, and, on the other hand, around each of its fuel pressure-tubes, across each of its two boundary-heads, a sleeve welded to the respective head by means of thin welds resistant enough for withstanding the same stresses as those to which the corresponding fuel pressure-tube is submitted, whereby the outer-cover is allowed to freely expand independently of the pressure-tubes.

The possibility of resorting to thin welds, instead of deep welds of the prior art, which is a substantial advantage of the present invention, is due to the fact that the vessel heads are submitted to smaller bending stresses than in the prior art.

The features of the present invention will be disclosed hereafter, reference being had to the accompanying drawing in which:

FIG. 4 is similar to FIG. 3 with slight changes;

FIG. 5 shows another form of embodiment of the flexible connection, the connecting element being a thin annular plate;

FIG. 6 is similar to FIG. 5 with slight changes; and

FIGS. 7 and 8 show two types of welds between a head of the vessel and a pressure-tube sleeve.

Figure 1:
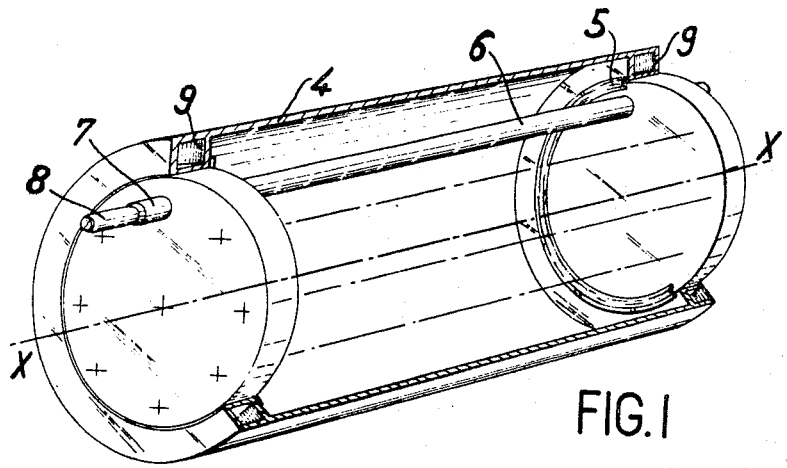
FIG. 1 is a diagrammatic perspective view of a vessel according to the invention.
Figure 2:
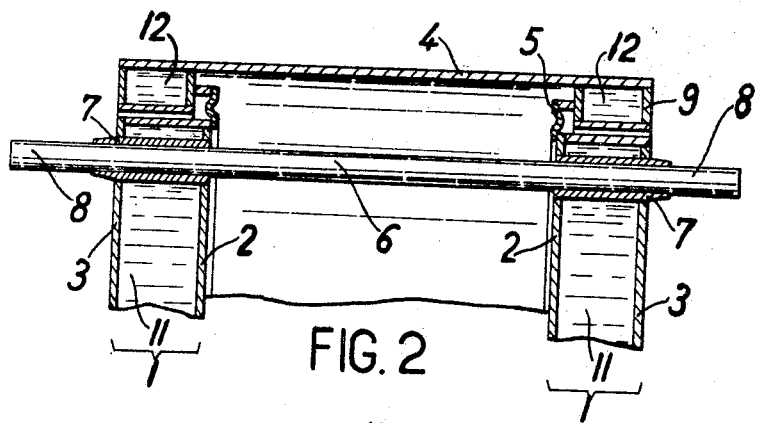
FIG. 2 is a partial cross-section of the vessel of FIG. 1, taken along a plane passing through the longitudinal axis XX of said vessel.

Referring to FIG. 2, the two boundary-heads 1 of a vessel are shown as being each constituted by two spaced circular plates 2 and 3 defining a tank, or drum; these two tanks are cooled by running water 11 and act as screens.

Both vessel-heads 1 are connected to the outer-cover 4 of the vessel by a flexible connecting element 5, but, on the other hand, they form a rigid unit with the fuel pressure-tubes 6 of zircalloy (only one tube is shown in FIG. 2), to which they are connected through the medium of sleeves 7 which are, in turn, welded to the extensions 8 of pressure-tubes 6 outside the vessel.

Figure 3:
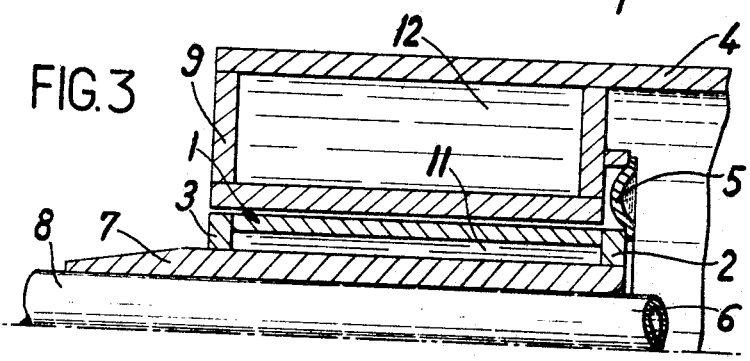
FIG. 3 shows, at a larger scale than in FIG. 2, the flexible connection between the outer-cover and one head of the vessel, the connecting element being a semitoric membrane.

The connecting element 5 between outer-cover 4 and a head 1 of the vessel (shown at a larger scale in FIG. 3) is constituted by a semi-toric membrane of stainless steel, which is chosen thick enough (about 3mm. or ⅛ in.) to allow parts 1 and 4 to move axially with respect to each other while ensuring the perfect tightness of the vessel.

The connection between element 5 and parts 1 and 4 is ensured by thin welds.

Outer-cover 4 comprises, in register with each of the vessel heads 1, a reinforced end-portion 9 filled with water 12 and which forms an extension of the corresponding head.

Connecting element 5 is mounted as close as possible to the peripheral sleeves in order to minimize possible deformations.

FIG. 4 shows a second semi-toric membrane 10 by which are balanced the stresses transmitted to connecting element 5.

According to a second form of embodiment shown in FIG. 5, each connecting element 5 is a thin annular plate of stainless steel welded to outer-cover 4 and to the inner plate 2 of the corresponding vessel head 1.

In FIG. 6, the annular plate 5 of FIG. 5 is shown as replaced by several plates thinner than that of FIG. 5, and containing an incompressible fluid, such a device has the advantage of forming a very flexible connection while being able to withstand a high internal pressure of the vessel, should a fuel pressure-tube happen to be broken.

In all the above-described forms of embodiment, the connection between the sleeves 7 and the vessel heads is ensured by thin welds; FIGS. 7 and 8 show two forms of embodiment of these welds 13 and 14.

The advantages of the present invention will be easily understood:

A vessel according to the present invention is constituted by two rigid structures, the one comprising the two vessel-heads 1 connected by the fuel pressure-tubes 6 which act as struts, while the other comprises the outer-cover 4 above. These two structures are allowed to expand in the direction of their common axis XX, independently of each other.

Since in the vessel according to the invention the stresses due to a difference between the expansion of the outer-cover and that of the fuel pressure-tubes are no longer to be feared, the connection between each of the plates of vessel-heads 1 and the sleeves 7 can be provided by rather thin welds, which are more rapidly made than the deep welds of the prior art.

Contrary to the prior art, the deformations are very small and the sleeves can therefore be machined prior to welding. A thermal treatment is no longer needed, and since the vessel heads are submitted but to weak stresses, they can be formed of several ready-made elements to be mounted on the site.

What is claimed is:

1. A nuclear-reactor vessel containing a liquid moderator, said vessel comprising two boundary-heads, each of which is formed of at least one plate, an outer-cover, a tight and flexible connecting element fixed to said outer-cover and to one of said boundary-heads by thin welds, a tight and flexible connecting element fixed to said outer-cover and to the other of said boundary-heads by thin welds, a plurality of fuel pressure-tubes extending between and across said two boundary-heads, a sleeve mounted around each of said fuel pressure-tubes extending between and across each of said boundary-heads, each of said sleeves being fixed to the respective boundary-head by thin welds, whereby said outer-cover is allowed to freely expand independently of said fuel pressure-tubes.

2. A nuclear-reactor vessel containing a liquid moderator, said vessel comprising two boundary-heads, each of which is formed of at least one plate, an outer-cover, a tight and flexible semi-toric membrane fixed to said outer-cover and to one of said boundary-heads by thin welds, a tight and flexible semi-toric membrane fixed to said outer-cover and to the other of said boundary-heads by thin welds, a plurality of fuel pressure-tubes extending between and across said two boundary-heads, a sleeve mounted around each of said fuel pressure-tubes across each of said boundary-heads, each of said sleeves being whereby said outer-cover is allowed to freely expand independently of said fuel pressure-tubes.

3. A nuclear-reactor vessel containing a liquid moderator, said vessel comprising two boundary-heads, each of which is formed of at least one plate, an outer-cover, a tight and flexible thin annular plate fixed to said outer-cover and to one of said boundary-heads by thin welds, a tight and flexible thin annular plate fixed to said outer-cover and to the other of said boundary-heads by thin welds, a plurality of fuel pressure-tubes extending between and across said two boundary-heads, a sleeve mounted around each of said fuel pressure-tubes across each of said boundary-heads, each of said sleeves being fixed to the respective boundary-head by thin welds, whereby said outer-cover is allowed to freely expand independently of said fuel pressure-tubes.

4. A nuclear-reactor vessel containing a liquid moderator, said vessel comprising two boundary-heads, each of which is formed of at least one plate, an outer cover, a tight and flexible connecting element fixed to said outer-cover and to one of said boundary-heads by thin welds, a tight and flexible connecting element fixed to said outer-cover and to the other of said boundary-heads by thin welds, each of said two connecting elements being constituted by a plurality of thin plates containing an incompressible fluid, a plurality of fuel pressure-tubes extending between and across said two boundary-heads, a sleeve mounted around each of said fuel pressure-tubes across each of said boundary-heads, each of said sleeves being fixed to the respective boundary-head by thin welds, whereby said outer-cover is allowed to freely expand independently of said fuel pressure-tubes.

5. A nuclear-reactor vessel containing a liquid moderator, said vessel comprising two boundary-heads, each of which is formed of two spaced plates defining a tank cooled by running water, an outer cover, a tight and flexible connecting element fixed to said outer-cover and to one of said boundary-heads by thin welds, a tight and flexible connecting element fixed to said outer-cover and to the other of said boundary-heads by thin welds, a plurality of fuel pressure-tubes extending between and across said two boundary heads, a sleeve mounted around each of said fuel pressure-tubes across each of said boundary-heads, each of said sleeves being fixed to both spaced plates of the respective boundary-head by thin welds, whereby said outer-cover is allowed to freely expand independently of said fuel pressure-tubes.

6. A nuclear-reactor vessel containing a liquid moderator, said vessel comprising two boundary-heads, each of which is formed of two spaced plates defining a tank cooled by running water, an outer cover, a first tight and flexible connecting element fixed to said outer-cover and to one of the plates of one of said boundary-heads by thin welds, a second tight and flexible connecting element fixed to said outer-cover and to the other plate of said one of said boundary-heads by thin welds, a first tight and flexible connecting element fixed to said outer-cover and to one of the plates of the other of said boundary-heads by thin welds, a second tight and flexible connecting element fixed to said outer-cover and to the other plate of said other of said boundary-heads by thin welds, a plurality of fuel pressure-tubes extending between and across said two boundary-heads, a sleeve mounted around each of said fuel pressure-tubes across each of said boundary-heads, each of said sleeves being fixed to both spaced plates of the respective boundary-head by thin welds, whereby said outer-cover is allowed to freely expand independently of said fuel pressure-tubes.

References Cited

UNITED STATES PATENTS

| | | |
|---|---|---|
| 3,055,538 | 9/1962 | Schoessow. |
| 3,186,913 | 6/1965 | Weisner _____ 176—50 |
| 3,240,678 | 3/1966 | Hemmerle et al. _____ 176—59 |

FOREIGN PATENTS 903,418    8/1962    Great Britain.

REUBEN EPSTEIN, *Primary Examiner.*